United States Patent
Qiu

(10) Patent No.: US 10,817,330 B2
(45) Date of Patent: *Oct. 27, 2020

(54) SERVICE PROCESSING METHOD AND APPARATUS

(71) Applicant: ALIBABA GROUP HOLDING LIMITED, Grand Cayman (KY)

(72) Inventor: Honglin Qiu, Hangzhou (CN)

(73) Assignee: ADVANCED TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,861

(22) Filed: May 27, 2020

(65) Prior Publication Data

US 2020/0285507 A1 Sep. 10, 2020

Related U.S. Application Data

(63) Continuation of application No. 16/779,641, filed on Feb. 2, 2020, which is a continuation of application (Continued)

(30) Foreign Application Priority Data

Jan. 26, 2017 (CN) .......................... 2017 1 0057243

(51) Int. Cl.
*G06F 9/46* (2006.01)
*G06F 8/61* (2018.01)
(Continued)

(52) U.S. Cl.
CPC ................ *G06F 9/466* (2013.01); *G06F 8/61* (2013.01); *G06Q 20/3821* (2013.01); *G06Q 40/12* (2013.12); *G06Q 20/389* (2013.01)

(58) Field of Classification Search
CPC .......... G06F 9/466; G06F 8/61; G06Q 40/12; G06Q 20/3821; G06Q 20/389
See application file for complete search history.

(56) References Cited

U.S. PATENT DOCUMENTS 5,613,012 A 3/1997 Hoffman et al.
7,013,290 B2 3/2006 Ananian
(Continued)

FOREIGN PATENT DOCUMENTS

CN 101102227 A 1/2008
CN 104715309 A 6/2015
(Continued)

OTHER PUBLICATIONS

Written Opinion of the International Searching Authority and International Search Report for PCT Application No. PCT/CN2018/073395 dated Mar. 30, 2018 (14 pages).
(Continued)

*Primary Examiner* — Wissam Rashid

(57) ABSTRACT

Methods, systems, and apparatus, including computer programs encoded on computer storage media, for transaction processing are provided. One of the methods includes: receiving a transaction request for a target transaction; loading a transaction template matching a transaction type of the target transaction; processing the target transaction according to the transaction template to obtain transaction information; and writing the transaction information into a blockchain.

17 Claims, 3 Drawing Sheets

Related U.S. Application Data

No. 16/450,976, filed on Jun. 24, 2019, which is a continuation of application No. PCT/CN2018/073395, filed on Jan. 19, 2018.

(51) Int. Cl.
*G06Q 20/38* (2012.01)
*G06Q 40/00* (2012.01)

(56) References Cited

U.S. PATENT DOCUMENTS

| | | |
|---|---|---|
| 7,661,106 B1 | 2/2010 | Ankireddipally et al. |
| 9,553,982 B2 | 1/2017 | Unitt |
| 2003/0187841 A1 | 10/2003 | Zhang et al. |
| 2005/0027871 A1 | 2/2005 | Bradley et al. |
| 2005/0080768 A1 | 4/2005 | Zhang et al. |
| 2007/0078860 A1 | 4/2007 | Enenkiel |
| 2007/0118549 A1 | 5/2007 | Bornhoevd et al. |
| 2010/0161778 A1 | 6/2010 | Guinard et al. |
| 2013/0114398 A1 | 5/2013 | Wang |
| 2015/0379510 A1 | 12/2015 | Smith |
| 2016/0261685 A1 | 9/2016 | Chen et al. |
| 2016/0261690 A1 | 9/2016 | Ford |
| 2017/0011460 A1* | 1/2017 | Molinari ............... G06F 21/645 |
| 2017/0230353 A1 | 8/2017 | Kurian et al. |
| 2017/0244707 A1 | 8/2017 | Johnsrud et al. |
| 2017/0264428 A1 | 9/2017 | Seger, II |
| 2017/0287090 A1 | 10/2017 | Hunn et al. |
| 2017/0289111 A1 | 10/2017 | Voell et al. |
| 2018/0069769 A1 | 3/2018 | Zou et al. |
| 2018/0183600 A1 | 6/2018 | Davis |
| 2018/0308134 A1 | 10/2018 | Manning et al. |
| 2018/0341648 A1 | 11/2018 | Kakavand et al. |
| 2019/0005470 A1 | 1/2019 | Uhr et al. |
| 2019/0026485 A1 | 1/2019 | Ansari et al. |

FOREIGN PATENT DOCUMENTS

| | | | |
|---|---|---|---|
| CN | 105608588 | A | 5/2016 |
| CN | 106230808 | A | 12/2016 |
| CN | 106296009 | A | 1/2017 |
| CN | 106296200 | A | 1/2017 |
| CN | 106301881 | A | 1/2017 |
| CN | 107025559 | A | 8/2017 |
| EA | 8614 | B1 | 6/2007 |
| JP | 2003-202994 | A | 7/2003 |
| KR | 10-1628624 | B1 | 6/2016 |
| KR | 10-1637854 | B1 | 7/2016 |
| RU | 2263348 | C2 | 10/2005 |
| TW | 1491290 | B | 7/2015 |
| WO | 2016188337 | A1 | 12/2016 |
| WO | 2017/007806 | A | 1/2017 |
| WO | 2017112664 | A1 | 6/2017 |
| WO | 2017132641 | A1 | 8/2017 |
| WO | 2017136643 | A1 | 8/2017 |
| WO | 2017155742 | A1 | 9/2017 |
| WO | 2017173271 | A1 | 10/2017 |
| WO | 2017173399 | A1 | 10/2017 |
| WO | 2017182788 | A1 | 10/2017 |
| WO | 2017187394 | A1 | 11/2017 |

OTHER PUBLICATIONS

International Preliminary Report on Patentability Chapter I for PCT Application No. PCT/CN2018/073395 dated Aug. 8, 2019 (12 pages).

Non-final rejection and Search Report for Taiwanese Application No. 106139290 dated Mar. 28, 2019 (10 pages).

Non-final rejection and Search Report for Taiwanese Application No. 106139290 dated Jul. 19, 2019 (9 pages).

First Search for Chinese Application No. 201710057243.2 dated Jul. 24, 2019 (1 page).

First Office Action for Chinese Application No. 201710057243.2 dated Aug. 5, 2019 (4 pages).

Office Action and Search Report for Russian Application No. 2019120078 dated Dec. 18, 2019 (16 pages).

First Examination Report for Australian Application No. 2018212186 dated Jan. 23, 2020 (6 pages).

Search Report for European Application No. 18743988.0 dated Dec. 16, 2019 (4 pages).

Examination Report for European Application No. 18743988.0 dated Jan. 22, 2020 (7 pages).

Supplementary Search Report for Chinese Application No. 201710057243.2 dated Jan. 22, 2020 (1 page).

Second Office Action for Chinese Application No. 201710057243.2 dated Feb. 7, 2020 (12 pages).

Swan, "Blockchain temporality: smart contract time specifiability with blocktime", International symposium on rules and rule markup languages for the semantic web, Springer, Cham, pp. 184-196, Jul. 6, 2016 (14 pages).

WikiPedia—Blockchain (database), <https://web.archive.org/web/20161016221031/https://en.wikipedia.org/wiki/Blockchain_(database)> published on Oct. 16, 2016 as per Wayback Machine (7 pages).

First Office Action dated Aug. 5, 2019, issued in related Chinese Application No. 201710057243.2, with English machine translation (12 pages).

Office Action for Korean Application No. 10-2019-7020783 dated May 21, 2020.

Ethereum-White Paper, Next-Generation Smart Contract and Decentralized Application Platform, Mar. 6, 2015.

Meduium.com, Ethereum Smart Contract (3)—Creating a blockchain bank, Dec. 3, 2016.

Examination Report No. 2 for Australian Application No. 2018212186 dated May 5, 2020.

Third Office Action for Chinese Application No. 201710057243.2 dated Apr. 14, 2020.

Search Report and Written Opinion dated Jul. 23, 2020, issued in related Singapore Application No. 11201906003V (12 pages).

Fourth Office Action dated Jul. 20, 2020, issued in related Chinese Application No. 201710057243.2, with English machine translation (7 pages).

Decision on Grant dated Apr. 29, 2020, issued in related Russian Application No. 2019120078, with English machine translation (19 pages).

* cited by examiner

SERVICE PROCESSING METHOD AND APPARATUS

CROSS REFERENCE TO RELATED APPLICATIONS

The present application is a continuation application of U.S. application Ser. No. 16/779,641, filed on Feb. 2, 2020, and titled "Service Processing Method and Apparatus," which is a continuation application of U.S. application Ser. No. 16/450,976, filed on Jun. 24, 2019, and titled "Service Processing Method and Apparatus." U.S. application Ser. No. 16/450,976 is a continuation application of International Patent Application No. PCT/CN2018/073395, filed on Jan. 19, 2018, and titled "Service Processing Method and Apparatus." International Patent Application No. PCT/CN2018/073395 claims priority to Chinese Patent Application No. 201710057243.2 filed on Jan. 26, 2017. The entire contents of all of the above applications are incorporated herein by reference in their entirety.

TECHNICAL FIELD

The present application relates to the field of computer technologies, and in particular, to a transaction processing method and apparatus.

BACKGROUND

Blockchain is also referred to as distributed ledger. Blockchain has attracted extensive attention since the emergence. With continuous development of computer technologies, blockchain will provide people with an increasingly safe data storage environment and convenience for data storage.

In an example of an application, a blockchain may be used to store transaction information generated in a transaction. However, the emergence of smart contracts further expands the service range of blockchains. A smart contract is a segment of codes stored in a blockchain (or a transaction processing node in the blockchain). Execution conditions and transaction processing logic of the smart contract are prescribed in the segment of codes. Namely, for a transaction processing request, conditions for invoking the smart contract and how to process a received transaction processing request after the smart contract is invoked are prescribed. Therefore, when a user is to process a designated transaction through a smart contract, the user may send a transaction parameter required for processing the designated transaction to a transaction processing node in a blockchain, causing the transaction processing node to execute the transaction parameter when the transaction parameter is determined to meet an execution condition prescribed by the smart contract, and then to complete the processing job of the designated transaction.

For example, when a user is to process some designated transactions through a smart contract, a storage address of the smart contract in the blockchain may be carried in a transaction processing request, causing a transaction processing node in the blockchain to determine the transaction parameter and the storage address of the smart contract in the blockchain from the transaction processing request when the transaction processing request is executed. According to the storage address, the transaction processing node may call the smart contract stored at the storage address and determine whether the transaction parameter meets the execution condition of the smart contract. If yes, the transaction processing node processes the transaction parameter according to the transaction processing logic pre-prescribed in the smart contract, so as to complete the processing job of the designated transactions.

Due to the feature that data stored in a blockchain is immutable, it is impossible to change a smart contract once the smart contract is stored in a blockchain. With continuous upgrades of transactions, a smart contract may not be able to support the processing job of the new (upgraded) transactions. To enable the smart contract to support the processing job of the new transactions, the smart contract has to be re-developed according to the new transactions and re-written into the blockchain.

Therefore, there is an urgent need for a transaction processing method for solving the problem in blockchains that existing transaction processing methods are not flexibly adaptable to upgrades to the transaction in blockchains.

SUMMARY

Embodiments of the specification provide a transaction processing method and apparatus for providing blockchain transaction processing methods that are compatible with and support upgrades to the transactions.

The embodiments of the specification provide a transaction processing method, comprising: receiving a transaction request for a target transaction; loading a transaction template matching a transaction type of the target transaction; processing the target transaction according to the transaction template to obtain transaction information; and writing the transaction information into a blockchain.

In some embodiments, loading a transaction template matching a transaction type of the target transaction comprises: determining a transaction identifier of the target transaction; and determining the transaction type of the target transaction according to the transaction identifier.

In other embodiments, loading a transaction template matching a transaction type of the target transaction comprises: selecting the transaction template matching the transaction type from a plurality of configured transaction templates; and loading the transaction template.

In still other embodiments, loading a transaction template matching a transaction type of the target transaction comprises: determining whether there is a transaction template matching the transaction type in a plurality of configured transaction templates; and in response to determining that there is no transaction template matching the transaction type in the plurality of configured transaction templates, generating the transaction template matching the transaction type; and loading the generated transaction template.

In yet other embodiments, processing the target transaction according to the transaction template comprises: determining one or more rules in the transaction template matching the target transaction; and processing the target transaction according to the one or more rules.

In other embodiments, processing the target transaction according to the transaction template comprises: processing the target transaction according to one or more rules in the transaction template.

In still other embodiments, processing the target transaction according to one or more rules comprises: determining a check rule in the one or more rules; checking whether the transaction request satisfies a preset condition according to the check rule; in response to determining that the transaction request satisfies the preset condition according to the check rule, processing the target transaction according to a processing rule in the one or more rules; and in response to determining that the transaction request does not satisfy the preset condition according to the check rule, prompting that the target transaction processing fails.

In yet other embodiments, the transaction request is a tracing data request and the target transaction has a tracing transaction type, and wherein loading a transaction template matching a transaction type of the target transaction comprises: determining a tracing transaction processing rule corresponding to the tracing transaction type from a tracing template, the tracing template corresponding to the tracing transaction type; and wherein processing the target transaction according to the transaction template to obtain transaction information and writing the transaction information into a blockchain comprises: analyzing the tracing data request to obtain tracing data, a recipient and a sender of the tracing data based on the tracing transaction processing rule; and transferring the tracing data from the sender to the recipient, generating corresponding transfer information, and writing the transfer information into the blockchain.

In other embodiments, the transaction request is an authentication data request and the target transaction has an authentication transaction type, and wherein loading a transaction template matching a transaction type of the target transaction comprises: determining an authentication transaction processing rule corresponding to the authentication transaction type from an authentication template, the authentication template corresponding to the authentication transaction type; and wherein processing the target transaction according to the transaction template to obtain transaction information and writing the transaction information into a blockchain comprises: analyzing the authentication data request to obtain authentication data based on the authentication transaction processing rule; and writing the authentication data into the blockchain.

In still other embodiments, the transaction request is a contract data request and the target transaction has a contract transaction type, and wherein loading a transaction template matching a transaction type of the target transaction comprises: determining a contract transaction processing rule corresponding to the contract transaction type from a contract transaction template, the contract transaction template corresponding to the contract transaction type; and wherein processing the target transaction according to the transaction template to obtain transaction information and writing the transaction information into a blockchain comprises: analyzing the contract data request to obtain a smart contract's address and transaction parameters based on the contract transaction processing rule; transmitting the transaction parameters to the smart contract according to the smart contract's address, to enable the smart contract to execute the transaction parameters and return a transaction result; and writing the received transaction result into the blockchain.

In yet other embodiments, the target transaction has an exchange transaction type, and wherein loading a transaction template matching a transaction type of the target transaction comprises: determining an exchange transaction processing rule corresponding to the exchange transaction type from an exchange template, the exchange template corresponding to the exchange transaction type; and wherein processing the target transaction according to the transaction template to obtain transaction information and writing the transaction information into a blockchain comprises: analyzing the transaction request to obtain a transaction initiator's account, a transaction amount, and a transaction recipient's account based on the exchange transaction processing rule; subtracting the transaction amount from the transaction initiator's account, and transferring the transaction amount into the transaction recipient's account to obtain transaction details; and writing the transaction details into the blockchain.

The embodiments of the specification provide a transaction processing method, comprising: receiving a transaction request for a target transaction; loading a transaction template matching a transaction type of the target transaction; processing the target transaction according to the transaction template to obtain transaction information; and writing the transaction information into a target block in a blockchain; and when writing the transaction information into the target block, determining and storing a state change value of the target block, the state change value being used to check whether the transaction information recorded in the target block is consistent with transaction information recorded in other blocks in the blockchain.

The embodiments of the specification provide a transaction processing apparatus, comprising: a receiving module configured to receive a transaction request; a determining module configured to determine a transaction type of a target transaction included in the transaction request; a template loading module configured to load, according to the transaction type, a transaction template matching the transaction type; and a processing module configured to process the target transaction according to the transaction template and write transaction information obtained from the processing into a blockchain.

The embodiments of the specification provide a transaction processing apparatus, comprising: a receiving module configured to receive a transaction request and determine a transaction type of a target transaction included in the transaction request; a template loading module configured to load, according to the transaction type, a transaction template matching the transaction type; and a processing module configured to process the target transaction according to the transaction template and write transaction information obtained from the processing into a target block in a blockchain; and when writing the obtained transaction information into the target block, determine and store a state change value of the target block, the state change value being used to check whether transaction information recorded in the target block is consistent with transaction information recorded in other blocks in the blockchain.

In some embodiments, a system for transaction processing comprises one or more processors and one or more non-transitory computer-readable memories coupled to the one or more processors and configured with instructions executable by the one or more processors to cause the system to perform operations comprising: receiving a transaction request for a target transaction; loading a transaction template matching a transaction type of the target transaction; processing the target transaction according to the transaction template to obtain transaction information; and writing the transaction information into a blockchain.

In some embodiments, a non-transitory computer-readable storage medium is configured with instructions executable by one or more processors to cause the one or more processors to perform operations comprising: receiving a transaction request for a target transaction; loading a transaction template matching a transaction type of the target transaction; processing the target transaction according to the transaction template to obtain transaction information; and writing the transaction information into a blockchain.

In some embodiments, a system for transaction processing comprises one or more processors and one or more non-transitory computer-readable memories coupled to the one or more processors and configured with instructions executable by the one or more processors to cause the system to perform operations comprising: receiving a transaction request for a target transaction; loading a transaction template matching a transaction type of the target transaction; processing the target transaction according to the transaction template to obtain transaction information; and writing the transaction information into a target block in a blockchain; and when writing the transaction information into the target block, determining and storing a state change value of the target block, the state change value being used to check whether the transaction information recorded in the target block is consistent with transaction information recorded in other blocks in the blockchain.

In some embodiments, a non-transitory computer-readable storage medium is configured with instructions executable by one or more processors to cause the one or more processors to perform operations comprising: receiving a transaction request for a target transaction; loading a transaction template matching a transaction type of the target transaction; processing the target transaction according to the transaction template to obtain transaction information; and writing the transaction information into a target block in a blockchain; and when writing the transaction information into the target block, determining and storing a state change value of the target block, the state change value being used to check whether the transaction information recorded in the target block is consistent with transaction information recorded in other blocks in the blockchain.

In some embodiments, a transaction processing method comprises: receiving a transaction request, and determining a transaction type of a target transaction included in the transaction request; loading, according to the transaction type, a transaction template matching the transaction type; processing the target transaction according to the transaction template and writing transaction information obtained from the processing into a target block in a blockchain; and when writing the obtained transaction information into the target block, determining and storing a state change value of the target block, the state change value being used to check whether transaction information recorded in the target block is consistent with transaction information recorded in other blocks in the blockchain.

The above-described at least one technical solution employed by the embodiments of the specification can achieve the following advantageous effects.

In the embodiments of the specification, after a transaction request sent by a user is received, according to a transaction type of a target transaction included in the transaction request, a transaction template matching the transaction type can be loaded, and the target transaction is processed according to the transaction template. Here, since a transaction processing node may load a transaction model that can process the target transaction included in the transaction request according to the transaction request sent by the user in the transaction processing process, thereby making the transaction processing in blockchains more flexible and facilitating the blockchain-based transaction processing for the user.

BRIEF DESCRIPTION OF THE DRAWINGS

The accompanying drawings to be described here are used to provide a better understanding of the specification and constitute a part of the specification. Embodiments are used to describe the specification and do not constitute improper limitations to the specification. In the accompanying drawings.

DETAILED DESCRIPTION

To enable one of ordinary skill in the art to better understand the technical solutions of the specification, the technical solutions in the embodiments of the specification will be clearly and completely described below with reference to the accompanying drawings in the embodiments of the specification. The described embodiments are merely some, but not all, embodiments of the specification. On the basis of the embodiments of the specification, all other embodiments obtainable by one of ordinary skill in the art without creative effort shall fall within the scope of the specification.

Figure 1:
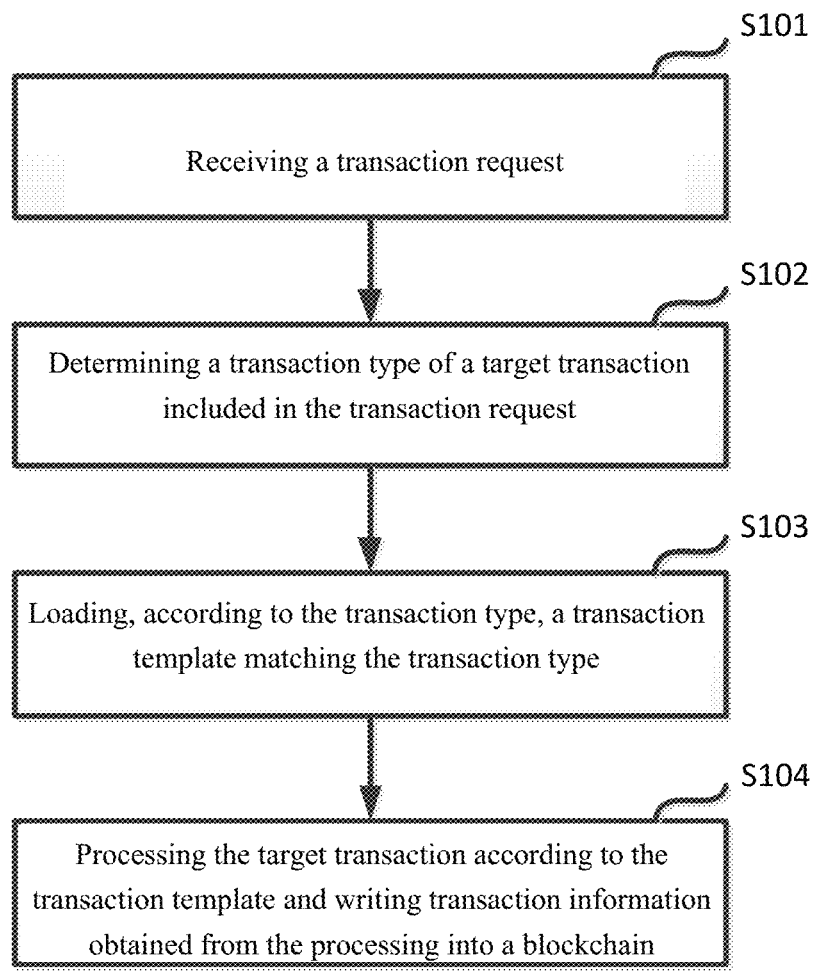
FIG. 1 is a schematic diagram of a transaction processing process according to some embodiments of the specification.

FIG. 1 is a schematic diagram of a transaction processing process according to some embodiments of the specification, comprising the following steps.

S101 includes: receiving a transaction request. In some embodiments, S101 includes receiving a transaction request for a target transaction.

In the embodiments of the specification, an execution entity of the embodiments of the specification may be a transaction processing node. The transaction processing node here is equipped with blockchain processing, namely, the transaction processing node is capable of processing blockchain transactions. Then, the transaction processing node may receive the transaction request.

The transaction request may be sent by a user to the transaction processing node via a terminal device (the terminal device here may be a mobile terminal, a PC terminal, etc.), or may be sent by a server that has received a transaction request sent by a user (the server may be equipped with blockchain processing and capable of performing data transmission with the transaction processing node), or may even be sent by a server not equipped with blockchain processing to the transaction processing node after the server receives a transaction request sent by a user, which is not limited by the embodiments herein.

For example, in a process of performing transaction processing, a user may input corresponding transaction data into a terminal, such as a computer, a mobile phone, etc., to trigger a transaction request. For example, when the user is to perform a transfer transaction, the user may input a transfer amount and a recipient of the transfer into a terminal, wherein the transfer amount and the transfer recipient input by the user and the transfer initiator (i.e., the user) may constitute transaction data of the transfer transaction input by the user. The user then sends the transaction request that carries the transaction data comprising the transfer amount, the transfer recipient, and the transfer initiator to a transaction processing node. For another example, when a user is to store data in a blockchain, the user may input the data into a terminal, wherein the data is transaction data of the data storage transaction input by the user, and then the user sends a transaction request that carries the transaction data comprising data to be stored to a transaction processing node. The manner in which the user sends the transaction request to the transaction processing node is not limited by the embodiments herein.

For yet another example, when a terminal detects that a user executes a designated operation (e.g., clicking a designated control displayed on the terminal interface, etc.), the terminal may determine transaction data input by the user into the terminal, then generate a corresponding transaction request according to the transaction data, and send the transaction request to a transaction processing node, causing the transaction processing node to receive the transaction request and process a target transaction included in the transaction request in a subsequent process. The manner in which the user sends the transaction request to a transaction processing node is not limited by the embodiments herein.

In some embodiments, in the transaction processing process in the embodiments of the specification, a user may input corresponding transaction data into a terminal and may also input the transaction data into a designated application installed on the terminal. Correspondingly, after the transaction data input by the user is received, the designated application may generate a corresponding transaction request. Then, when a designated operation by the user is detected (e.g., clicking a designated control, etc.), the designated application may send the transaction request to a transaction processing node.

S102 includes: determining a transaction type of a target transaction included in the transaction request. S102 may be optional.

After the transaction processing node receives the transaction request sent by the user through the terminal, the transaction processing node may further determine a transaction type of a target transaction included in the transaction request. This action is provided for the following purpose: in the embodiments of the specification, transaction templates may be pre-stored in the transaction processing node, and different transaction templates correspond to different transaction processing jobs; therefore, after the transaction processing node receives the transaction request sent by the user, the transaction processing node may determine which transaction template from the pre-stored transaction templates is able to process the target transaction included in the transaction request. The transaction processing node stores transaction templates corresponding to transaction types. Therefore, in the process of determining which transaction template is able to process the target transaction included in the transaction request, the transaction processing node may determine the transaction type of the target transaction, then determine the transaction template corresponding to the transaction type according to the pre-stored relationship between transaction types and transaction templates, and further process the target transaction included in the transaction request through the transaction template in the subsequent process.

In one example, after the transaction processing node receives the transaction request sent by the user, the transaction processing node may determine a transaction identifier of the target transaction included in the transaction request, and determine the transaction type of the target transaction according to the transaction identifier, wherein the transaction identifier may be a string of numbers and a part of the string of numbers is a transaction code capable of representing the target transaction. For example, in the transaction identifier #244340923, #2 is a transaction code representing a target transaction. The transaction identifier may also be in other forms. For example, when the transaction request comprises characters of "transfer type," "transfer type" is the transaction identifier of the target transaction included in the transaction request.

In some embodiments, the transaction templates pre-stored in the transaction processing node according to the embodiments of the specification may be built through API and stored in the transaction processing node.

S103 includes: loading, according to the transaction type, a transaction template matching the transaction type. In some embodiments, S103 includes loading a transaction template matching a transaction type of the target transaction.

In the embodiments of the specification, transaction templates corresponding to various transaction types may be pre-stored in the transaction processing node. Therefore, after the transaction processing node receives the transaction request sent by the user, the transaction processing node may load, according to the determined transaction type corresponding to the target transaction included in the transaction request, a transaction template matching the transaction type from the pre-stored transaction templates. Then in the subsequent process, the transaction processing node may process the target transaction through the transaction template.

For example, assuming that the user initiates a transfer request (i.e., a transaction request) to the transaction processing node, after the transaction processing node receives the transfer request, the transaction processing node may analyze the transfer request and determine that the transaction type corresponding to the transfer request is transfer transaction. Then, the transaction processing node determines and loads a transfer template matching the transfer transaction (i.e., the transaction type) from the pre-stored transaction templates. In the subsequent process, the transaction processing node processes the transfer request through the transfer template.

After the transaction processing node determines the transaction type of the target transaction included in the transaction request, the transaction processing node may find that there is no transaction template matching the transaction type in the pre-configured transaction templates. Namely, none of the transaction templates is able to process the target transaction included in the transaction request. Then, the transaction processing node may generate a transaction template capable of processing the target transaction according to the transaction code input by the user, and then process the target transaction through the generated transaction template.

In one example, when the transaction processing node receives a transaction request sent by a user, the transaction processing node determines that there is no transaction template corresponding to the transaction request in the pre-configured transaction templates. Then, the transaction processing node may prompt the user that the target transaction included in the transaction request cannot be processed. When the user sees the prompt, the user may compile a transaction code required for processing the target transaction in the transaction processing node for the target transaction, and the transaction processing node may generate a corresponding transaction template according to the transaction code input by the user. Then, the transaction processing node may load the generated transaction template and process the target transaction.

In an example of an application, data formats that different transaction templates can read are different. Therefore, after the transaction processing node receives a transaction request sent by a user, the transaction processing node may also read the transaction request sequentially through the pre-stored transaction templates. When the transaction processing node is able to read the transaction request through a transaction template (i.e., the data format of the transaction request matches the transaction template), the transaction processing node may process the target transaction included in the transaction request through the transaction template in the subsequent process.

Since data in a transaction processing node may be changed, transaction templates pre-stored in the transaction processing node may be updated and adjusted. Therefore, when a transaction is continuously upgraded, a user may correspondingly upgrade the transaction templates in the transaction processing node. The user may perform upgrades and adjustments based on the original transaction templates, to enable the transaction templates to support the upgraded transaction, thereby significantly improving the transaction maintenance efficiency.

However, since data stored in a blockchain is immutable, the use of a blockchain by the user to store data will effectively ensure the security of data storage, thereby providing an advantageous verification basis for subsequent data verification by the user. On the other hand, the immutability of data also leads to inconvenience in transaction processing for a blockchain, and one of the most significant issues is that smart contracts currently supporting blockchain transaction expansion are stored in the blockchain, and therefore, the smart contracts may not be updated with the continuous upgrades of the transactions. To enable smart contracts to support the processing job of the new transactions, the user needs to re-develop smart contracts and write the re-developed smart contracts into the blockchain. Therefore, the continuous upgrades of the transactions will inevitably force the user to keep on re-developing smart contracts, thereby resulting significant inconvenience in transaction maintenance for the user.

In the embodiments of the specification, all transaction templates for processing various target transactions may be pre-stored in a transaction processing node, rather than stored in the blockchain. Therefore, when a transaction is upgraded, a user may perform corresponding updates on the transaction templates stored in the transaction processing node to make the transaction templates capable of supporting the upgraded transaction. The cost of transaction maintenance will be greatly reduced. Meanwhile, the flexibility of transaction processing in blockchains is greatly enhanced.

In addition, in examples of applications, system resources required in a process of smart contract execution are allocated by a virtual machine. Since the virtual machine is partitioned from a server, however, the virtual machine may only possess a part of system resources of the server. The allocation, by the virtual machine, of system resources required by the smart contract means that the smart contract can only obtain required system resources from the part of system resources of the server possessed by the virtual machine. In this way, the smart contract obtains a small amount of system resources. In order to adapt to an increasingly high amount of transaction demand, however, the smart contract may need to obtain more system resources from the virtual machine to provide sufficient support to an increasing amount of transactions. The virtual machine's own performance issue (i.e., the virtual machine owns a relatively small amount of system resources, and the amount of system resources allocated to the smart contract is also relatively low) makes it impossible for the smart contract to provide good support to the increasing amount of transactions, thereby greatly lowering the blockchain transaction processing efficiency and resulting in inconvenience to users.

In the embodiments of the specification, transaction templates corresponding to various transactions may be pre-stored in a transaction processing node. In a process of initiating a transaction template to process a transaction request, the transaction processing node may allocate more system resources to the process of processing the transaction request as the transaction processing node possesses the same amount of system resources as a server does. Therefore, with a continuous increase of transaction quantity, the transaction processing node can still strongly support the processing of various transactions, thereby ensuring the blockchain transaction processing efficiency.

S104 includes: processing the target transaction according to the transaction template and writing transaction information obtained from the processing into a blockchain. In some embodiments, S104 includes processing the target transaction according to the transaction template to obtain transaction information and writing the transaction information into a blockchain.

After the transaction processing node determines the transaction template matching the transaction type, the transaction processing node may process the target transaction included in the transaction request through the transaction template, wherein the transaction template comprises a pre-prescribed transaction processing rule, and the transaction processing node may process the target transaction according to the transaction processing rule.

In examples of applications, each type of transactions comprises several sub-transactions. For example, financial transactions may comprise sub-transactions such as transfer transaction, finance management transaction, etc., on the basis of which, in the embodiments of the specification, a transaction processing rule in each transaction template may be responsible for transaction processing of a type of transactions, while each transaction processing rule comprises a plurality of processing rules with different processing rules correspondingly processing different sub-transactions in the type of transactions. For example, for financial transactions, the transaction processing node may store a financial transaction template responsible for financial transaction processing, while the financial transaction template comprises various processing rules for processing transfer, finance management, and other sub-transactions.

Therefore, in the embodiments of the specification, after the transaction processing node loads, according to the transaction type of the target transaction included in the transaction request, a transaction template matching the transaction type, the transaction processing node may determine a transaction processing rule comprised in the transaction template. Then, the transaction processing node may further determine a processing rule matching the target transaction from processing rules and process the target transaction through the processing rule.

For example, assuming that the transaction request received by the transaction processing node is a transfer request sent by the user, the transaction processing node may determine that the transaction type of the transaction request is financial. Then, the transaction processing node may determine and load a transaction template capable of processing financial transactions from the pre-stored transaction templates. After the transaction processing node loads the transaction template, the transaction processing node may determine a transaction processing rule comprised in the transaction template. Then, the transaction processing node may determine a transfer processing rule (i.e., the above-described processing rule) matching the transfer transaction from processing rules and process the transfer transaction through the processing rule.

In examples of applications, transaction requests input by a user to a transaction processing node may create situations such as data format incompliance with the provisions, illegal transaction request, etc. When the transaction processing node processes these transaction requests with the issues, the operations of the transaction processing node may be affected, and the transaction processing node may even collapse in severe situations.

To ensure effective operations of the transaction processing node and ensure the transaction processing efficiency of the transaction processing node, in the embodiments of the specification, the transaction processing node may check a received transaction request according to the determined transaction template (the transaction template being used for processing the transaction request received by the transaction processing node).

In one example, after the transaction processing node determines the transaction template corresponding to the transaction request (i.e., the transaction template corresponding to the transaction type of the target transaction), the transaction processing node may determine a transaction processing rule comprised in the transaction template from the transaction template, wherein the transaction processing rule comprises processing rules for executing transaction processing and check rules for checking transaction requests. Therefore, the transaction processing node may check the transaction request according to the check rules. When the transaction processing node determines that the transaction request satisfies a preset condition prescribed in the check rules (i.e., the transaction request is a legal and normal request), the transaction processing node may process the target transaction; when the transaction processing node determines that the transaction request does not satisfy a preset condition prescribed in the check rules (i.e., the transaction request may have problems such as incompliant data format, illegal transaction request, etc.), the transaction processing node may not process the target transaction, and return a prompt to the user that the transaction request processing fails, causing the user to re-initiate a transaction request to the transaction processing node according to the prompt.

After the transaction processing node completes the processing of the transaction request through the transaction template, the transaction processing node may obtain corresponding transaction information. The transaction information here may be transaction results obtained after the transaction processing node processes the transaction, transaction records for showing the entire transaction processing process, or transaction data comprised in the transaction request. The transaction processing node may subsequently write the transaction information into a blockchain. This way, the user may subsequently search for the transaction information in the blockchain and then perform operations such as data verification on the transaction information.

In the embodiments of the specification, the transaction templates pre-stored in the transaction processing node may be directed to a variety of transactions, and in examples of applications, transactions involving blockchains may be mainly divided into the following four types:

I. Tracing transactions, which record a transfer path of a designated piece of data in detail, enabling a user to determine the original holder of the designated piece of data through the transfer path of the designated piece of data recorded in a blockchain, i.e., tracing to the source of the designated piece of data.

II. Authentication transactions, which use the immutability of data stored in a blockchain and store designated data in the blockchain for later verification of the designated data or for verification of other data through the designated data.

III. Smart contract-based transactions, which are particular transactions implemented using smart contracts, such as regularly returning profits from finance management products to users by executing a smart contract in a blockchain.

IV. Exchange transactions, which achieve transactions between users through a blockchain and record transaction details in the transactions process in the blockchain.

With respect to the above-described four types of transactions, transaction templates capable of processing these four types of transactions may be pre-stored in the transaction processing node in the embodiments of the specification. Therefore, after the transaction processing node receives transaction requests for these four types of transactions, the transaction processing node may load the pre-stored four types of transaction templates to process target transactions included in the four types of transaction requests, wherein the four types of transaction requests may be a tracing template, an authentication template, a contract template, and an exchange template, respectively.

To further describe the transaction processing process in the embodiments of the specification, the transaction processing processes of these four types of transaction requests will be described in detail below.

When a transaction processing node receives a tracing data request sent by a user, the transaction processing node may determine, according to a tracing transaction identifier comprised in the tracing data request, the tracing transaction type corresponding to the tracing transaction identifier, and then, the transaction processing node may determine and load, according to the tracing transaction type, a tracing model matching the tracing transaction type from the pre-stored transaction templates. Then, by activating the tracing template, the transaction processing node processes a tracing transaction included in the tracing data request.

In the process that the transaction processing node processes the tracing transaction through the tracing template, the transaction processing node may determine a tracing transaction processing rule corresponding to the tracing transaction type, and then execute the tracing transaction processing rule to analyze the tracing data request to obtain tracing data, an address of the tracing data recipient, and an address of the tracing data sender included in the tracing data request. Subsequently, the transaction processing node may further send the tracing data to the tracing data recipient and generate corresponding tracing data transfer information. Then, the transaction processing node writes the transfer information into a blockchain, enabling the user to subsequently determine a transfer path of the tracing data through the transfer information stored in the blockchain.

With respect to the authentication transactions, when a transaction processing node receives an authentication data request sent by a user, the transaction processing node may determine the authentication transaction type corresponding to the authentication data request, and load an authentication template matching the authentication transaction type from the pre-stored transaction templates. The transaction processing node may determine an authentication transaction processing rule corresponding to the authentication transaction type from the authentication template, analyze the authentication data request to obtain, through the authentication transaction processing rule, authentication data to be written into a blockchain as required by the user from the authentication data request, and then write the authentication data into the blockchain.

In the embodiments of the specification, the transaction processing node may also execute transactions through a smart contract stored in the blockchain, namely, a contract template (i.e., a transaction template) corresponding to a transaction to be executed through a smart contract may be pre-stored in the transaction processing node. Then, when the transaction processing node receives a contract data request sent by a user, the transaction processing node may determine the contract transaction type corresponding to the contract data request, and determine, according to the contract transaction type, a contract template corresponding to the contract transaction type from the pre-stored transaction templates. The blockchain may further determine a contract transaction processing rule matching the contract transaction type from the contract template, and analyze the contract data request, through executing the contract transaction processing rule, to obtain a contract's address and transaction parameters included in the contract data request, wherein the contract's address is the storage address of the smart contract in the blockchain. Subsequently, the transaction processing node may search for the smart contract in the blockchain at the contract's address and then transmit the determined transaction parameters to the smart contract, causing the smart contract to automatically execute the transaction parameters and return corresponding transaction results (i.e., the transaction information) to the transaction processing node. After the transaction processing node receives the transaction results returned by the smart contract, the transaction processing node may display the transaction results to the user and at the same time, write the transaction results into the blockchain for later operations by the user such as performing data verification on the transaction results.

With respect to the exchange transactions, when a transaction processing node receives a transaction request sent by a user, the transaction processing node may determine an exchange template capable of processing the transaction request from the pre-stored transaction templates, and process an exchange transaction included in the transaction request by loading the exchange template, wherein the transaction processing node may first determine, according to the determined exchange transaction type, an exchange transaction processing rule matching the exchange transaction type from the exchange template. Through the exchange transaction processing rule, the transaction processing node obtains information involved in the transaction request through analysis, such as transaction initiator, transaction recipient, transaction amount, etc., achieves subtraction of a corresponding transaction amount from an account of the transaction initiator by executing the exchange transaction processing rule, and then transfers this transaction amount into transaction processing in an account of the transaction recipient. In this process, the transaction processing node may obtain transaction details of this transaction (i.e., the transaction information). For the user to see the transaction details in the blockchain in a subsequent process and for a transaction certificate of the transaction details to be provided to the user in a subsequent process, the transaction processing node may write the transaction details into the blockchain.

In the embodiments of the specification, the transaction processing node may also support transaction processing of other transactions, and a user may load a transaction template of a desired transaction into the transaction processing node to achieve processing of the transaction by the transaction processing node.

In some embodiments, transaction templates for processing various target transactions may be pre-stored in a transaction processing node rather than a blockchain. Therefore, when a transaction is upgraded, a user may perform corresponding updates on the transaction templates stored in the transaction processing node to make the transaction templates capable of supporting the upgraded transaction. The cost of transaction maintenance will be greatly reduced.

In the embodiments of the specification, the user may pre-compile all transaction templates and input the transaction templates into the transaction processing node. Correspondingly, after the transaction processing node receives the transaction templates input by the user, the transaction processing node may store the transaction templates to the transaction processing node. In a subsequent process, the transaction processing node may process received transaction requests by loading these transaction templates.

In the embodiments of the specification, the user may package and release all transaction templates on a transaction platform, causing other users in need of a transaction template installation package to download the corresponding transaction template installation package from the transaction platform and to store the transaction template installation package in a local transaction processing node. After the local transaction processing node loads the transaction template installation package, the transaction processing node possesses capability to process transactions corresponding to the transaction template, as shown in FIG. 2.

Figure 2:
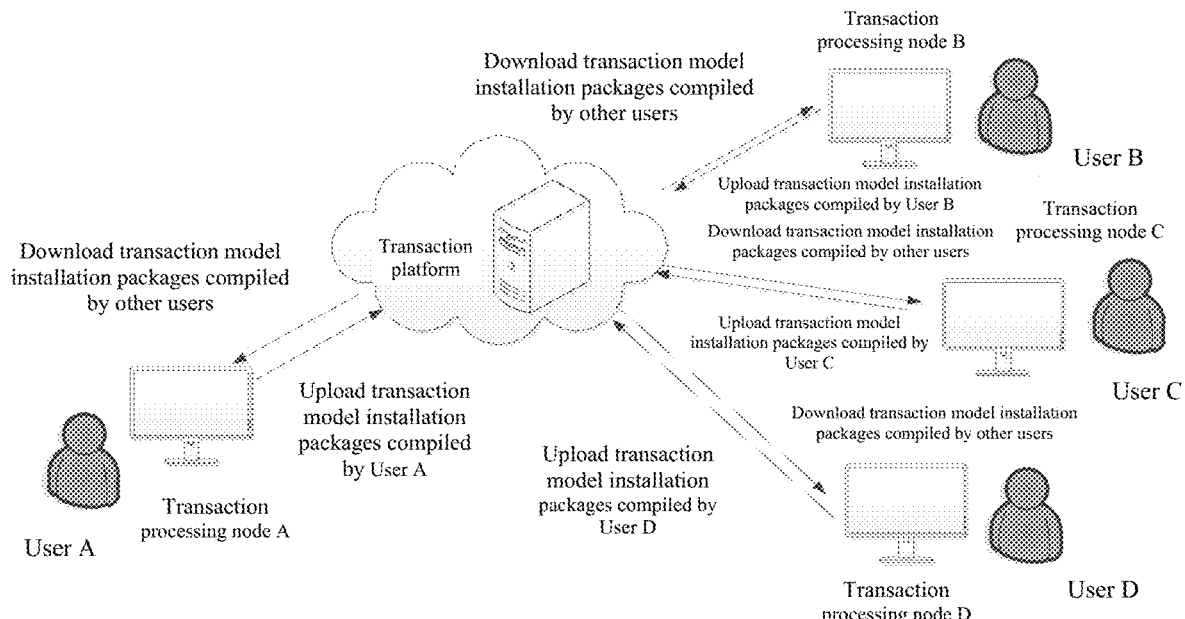
FIG. 2 is a schematic diagram of users releasing transaction template installation packages on a transaction platform according to some embodiments of the specification.

FIG. 2 is a schematic diagram of users releasing transaction template installation packages on a transaction platform according to some embodiments of the specification.

In FIG. 2, a user A may compile transaction templates using a compiled language and package the transaction templates, respectively, for uploading to a transaction platform. After the transaction platform receives the transaction template installation packages uploaded by the user A, the transaction platform may release the transaction template installation packages for other users to download and use. The transaction template installation packages may also be uploaded by other users, and the users may share their respectively compiled transaction template installation packages on the transaction platform for users to use.

In examples of applications, smart contracts are compiled and written into a blockchain by users themselves. If a user compiles and writes a malicious smart contract into a blockchain, the smart contract may result in inconvenience and losses to transaction processing based on the smart contract by other users.

To prevent the above-described situation, in the embodiments of the specification, the transaction platform may check transaction template installation packages uploaded by users. When it is found that a transaction template installation package uploaded by a user comprises malicious codes, the transaction template installation package will not be released, thereby providing a good environment to download transaction template installation packages for users.

Figure 3:
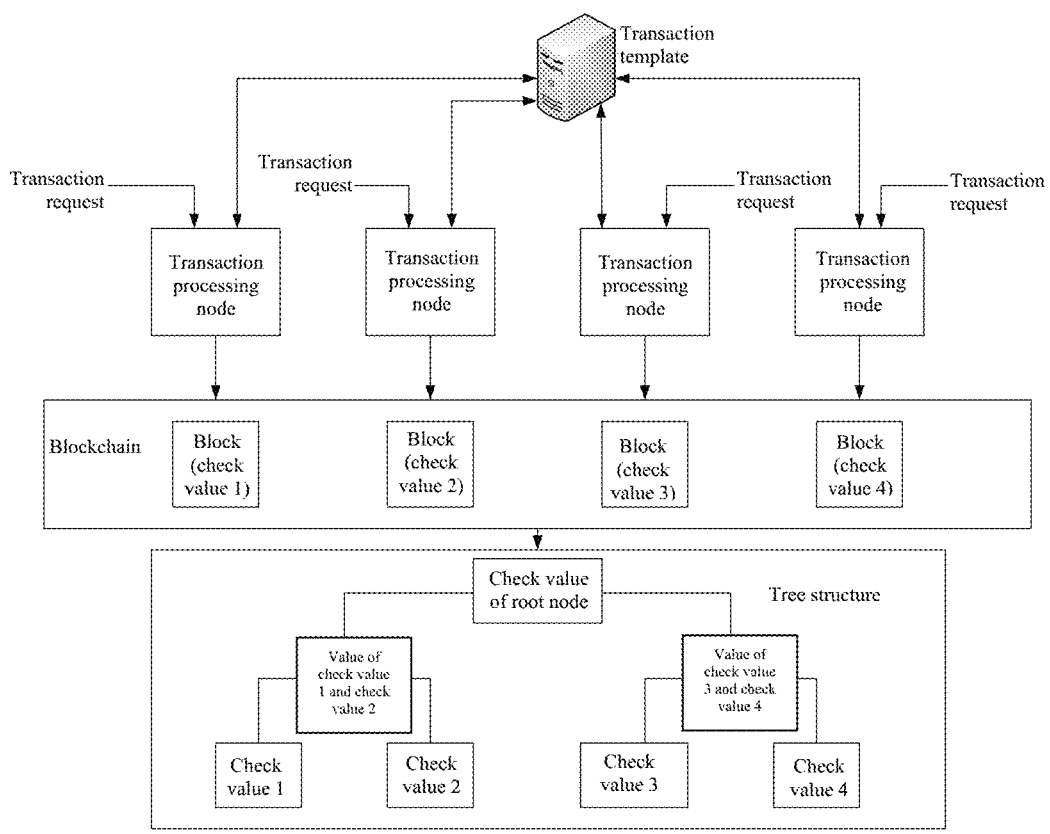
FIG. 3 is a schematic diagram of another transaction processing process according to some embodiments of the specification.

The embodiments of the specification further provide a transaction processing method. FIG. 3 is a schematic diagram of a transaction processing method according to some embodiments of the specification.

A transaction processing node receives a transaction request, and determines a transaction type of a target transaction included in the transaction request; loads, according to the transaction type, a transaction template matching the transaction type; further processes the target transaction according to the transaction template and writes transaction information obtained from the processing into a target block in a blockchain; and when writing the obtained transaction information into the target block, determines and stores a state change value of the target block, the state change value being used to check whether transaction information recorded in the target block is consistent with transaction information recorded in other blocks in the blockchain.

Furthermore, the determining and storing a state change value of the target block comprises:

after writing the obtained transaction information into the target block, computing a check value of the target block; determining the check value as the state change value of the target block; and storing the state change value in the blockchain.

Namely, when transaction information is written into different blocks, change values of the blocks may be determined through computation. This way, the change values of different blocks are sequentially stored in a tree structure such as a Merkle tree, and then whether data stored in different blocks in the blockchain is consistent may be determined through a Hash value of a root node of the Merkle tree.

The blockchain according to the embodiments of the specification may be a blockchain such as Bitcoin blockchain, Ethereum blockchain, Litecoin blockchain, etc.

In some embodiments, after the transaction processing node completes processing of the target transaction desired by the user (i.e., the target transaction included in a transaction request sent by the user) through the determined transaction template, the transaction processing node may unload the loaded transaction model, thereby saving the memory space of the transaction processing node. Alternatively, after the transaction processing node completes processing of the target transaction, the transaction processing node may also place the transaction template in sleep and re-activate the transaction template, after a transaction request corresponding to the transaction template is later received, to process the transaction request.

In the embodiments of the specification, all transaction templates for processing various target transactions may be pre-stored in a transaction processing node, rather than stored in a blockchain. Therefore, when a transaction is upgraded, a user may perform corresponding updates on the transaction templates stored in the transaction processing node to make the transaction templates capable of supporting the upgraded transaction. The cost of transaction maintenance will be greatly reduced. Meanwhile, the problem that transaction processing methods are not flexibly adaptable to transaction upgrades is solved, and the flexibility of transaction processing in blockchains is greatly enhanced.

Moreover, in a process that the transaction processing node performs transaction processing through the pre-stored transaction templates, all system resources required for processing a target transaction through a transaction template are allocated by the transaction processing node itself, and the transaction processing node may use all system resources of the transaction processing node for processing the target transaction, which prevents the situation of insufficient system resources called by a virtual machine in a process of smart contract execution, greatly improves the blockchain transaction processing efficiency, and facilitates transaction processing of a user.

In the embodiments of the specification, in a process of transaction processing, a user may input a corresponding transaction request to the transaction processing node. After the transaction processing node receives the transaction request, the transaction processing node determines a transaction type of a target transaction included in the transaction request, loads a transaction template matching the transaction type, and processes the target transaction through the transaction template, wherein the transaction processing node may be a terminal capable of processing blockchain transactions, a server for processing blockchain transactions, or a client or application for processing blockchain transactions.

The above-described is the transaction processing method according to the embodiments of the specification. The embodiments of the specification further provide a transaction processing apparatus, as shown in FIG. 4.

Figure 4:
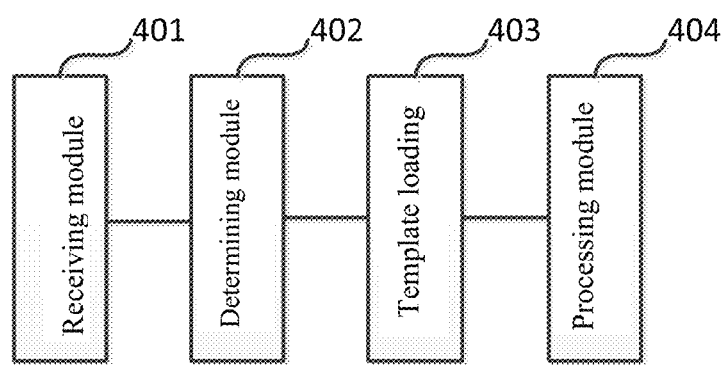
FIG. 4 is a schematic diagram of a transaction processing apparatus according to some embodiments of the specification.

FIG. 4 is a schematic diagram of a transaction processing apparatus according to some embodiments of the specification, comprising: a receiving module 401 configured to receive a transaction request; a determining module 402 configured to determine a transaction type of a target transaction included in the transaction request; a template loading module 403 configured to load, according to the transaction type, a transaction template matching the transaction type; and a processing module 404 configured to process the target transaction according to the transaction template and write transaction information obtained from the processing into a blockchain.

The determining module 402 is configured to determine a transaction identifier of the target transaction, and determine the transaction type of the transaction to be processed according to the transaction identifier.

The template loading module 403 is configured to determine the transaction template matching the transaction type from the configured transaction templates and load the transaction template.

The template loading module 403 is configured to generate, if there is no transaction template matching the transaction type in the configured transaction templates, the transaction template matching the transaction type; and load the generated transaction template.

The processing module 404 is configured to process the target transaction according to a transaction processing rule included in the transaction template.

The processing module 404 is configured to determine a transaction processing rule in the transaction template corresponding to the target transaction; and process the target transaction according to the transaction processing rule.

The processing module 404 is configured to determine a check rule included in the transaction processing rule; check whether the transaction request satisfies a preset condition according to the check rule; if the transaction request satisfies the preset condition according to the check rule, process the target transaction according to the processing rule in the transaction processing rule; and if the transaction request does not satisfy the preset condition according to the check rule, prompt that the target transaction processing fails.

The template loading module 403 is configured to determine, if the determined transaction type is the tracing transaction type, a tracing transaction processing rule corresponding to the tracing transaction type from a tracing template, the tracing template corresponding to the tracing transaction type; and the processing module 404 is configured to analyze the tracing data request to obtain, based on the tracing transaction processing rule, tracing data, data of a recipient and a sender of the tracing data included in the tracing data request; transfer the tracing data from a sender to a recipient, generate corresponding transfer information, and write the transfer information into the blockchain.

The template loading module 403 is configured to determine, if the determined transaction type is the authentication transaction type, an authentication transaction processing rule corresponding to the authentication transaction type from an authentication template, the authentication template corresponding to the authentication transaction type; and the processing module 404 is configured to analyze the authentication data request to obtain, based on the authentication transaction processing rule, authentication data included in the authentication data request; and write the authentication data into the blockchain.

The template loading module 403 is configured to determine, if the determined transaction type is the contract transaction type, a contract transaction processing rule corresponding to the contract transaction type from a contract transaction template, the contract transaction template corresponding to the contract transaction type; and the processing module 404 is configured to analyze the contract data request to obtain, based on the contract transaction processing rule, a contract's address and transaction parameters included in the contract data request; transmit, according to the contract's address, the transaction parameters to a smart contract corresponding to the contract's address, causing the smart contract to execute the transaction parameters and return corresponding transaction results; and write the received transaction results into the blockchain.

The template loading module 403 is configured to determine, if the determined transaction type is the exchange type, an exchange processing rule corresponding to the exchange type from an exchange template, the exchange template corresponding to the exchange type; and the processing module 404 is configured to analyze the transaction request to obtain, based on the exchange processing rule, a transaction initiator's account, a transaction amount, and a transaction recipient's account included in the transaction request; subtract the transaction amount from the transaction initiator's account, and transfer the transaction amount into the transaction recipient's account to obtain transaction details; and write the transaction details into the blockchain.

In the embodiments of the specification, after the transaction processing node receives the transaction request sent by the user, the transaction processing node may load, according to the transaction type of the target transaction included in the transaction request, a transaction template matching the transaction type, and process the target transaction through the transaction template. Here, all transaction templates for processing various target transactions may be pre-stored in the transaction processing node, rather than stored in a blockchain. Therefore, when a transaction is upgraded, the user may perform corresponding updates on the transaction templates stored in the transaction processing node to make the transaction templates capable of supporting the upgraded transaction. The cost of transaction maintenance will be greatly reduced relative. Meanwhile, the problem that transaction processing methods are not flexibly adaptable to transaction upgrades is solved, and the flexibility of transaction processing in blockchains is greatly enhanced.

Moreover, in a process that the transaction processing node performs transaction processing through the pre-stored transaction templates, all system resources required for processing a target transaction through a transaction template are allocated by the transaction processing node itself, and the transaction processing node may use all system resources of the transaction processing node for processing the target transaction, which prevents the situation of insufficient system resources called by a virtual machine in a process of smart contract execution, greatly improves the blockchain transaction processing efficiency, and facilitates transaction processing of a user.

In some embodiments, the various modules and units of transaction processing may be implemented as software instructions (or a combination of software and hardware). That is, the apparatus for transaction processing described with reference to FIG. 4 may comprise a processor (e.g., the CPU) and a non-transitory computer-readable storage medium (e.g., the memory) storing instructions that, when executed by the processor, cause one or more components (e.g., the processor) of the apparatus to perform various steps and methods of the modules and units described above. The apparatus for transaction processing may also be referred to as a system for transaction processing. In some embodiments, the apparatus for transaction processing may include a server, a mobile phone, a tablet computer, a PC, a laptop computer, or another computing device.

Figure 5:
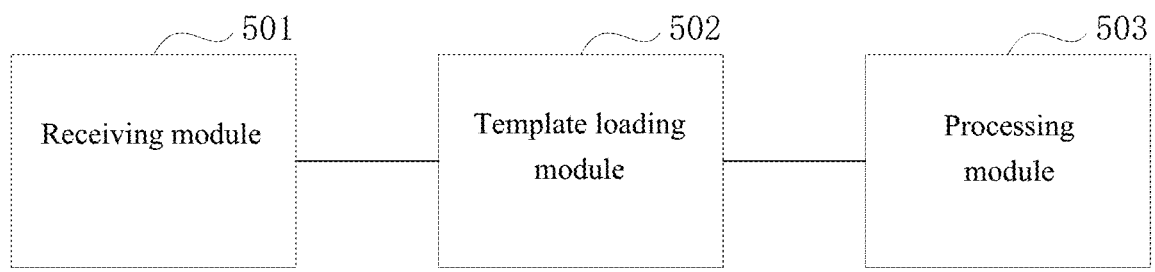
FIG. 5 is a schematic diagram of another transaction processing apparatus according to some embodiments of the specification.

The embodiments of the specification further provide a transaction processing apparatus, as shown in FIG. 5.

FIG. 5 is a schematic diagram of a transaction processing apparatus according to some embodiments of the specification, comprising: a receiving module 501 configured to receive a transaction request and determine a transaction type of a target transaction included in the transaction request; a template loading module 502 configured to load, according to the transaction type, a transaction template matching the transaction type; and a processing module 503 configured to process the target transaction according to the transaction template and write transaction information obtained from the processing into a target block in a blockchain; and when writing the obtained transaction information into the target block, determine and store a state change value of the target block, the state change value being used to check whether transaction information recorded in the target block is consistent with transaction information recorded in other blocks in the blockchain.

In some other embodiments of the specification, the processing module 503 determining and storing a state change value of the target block comprises: after writing the obtained transaction information into the target block, computing a check value of the target block; determining the check value as the state change value of the target block; and storing the state change value in the blockchain.

In some embodiments, the various modules and units of transaction processing may be implemented as software instructions (or a combination of software and hardware). That is, the apparatus for transaction processing described with reference to FIG. 5 may comprise a processor (e.g., the CPU) and a non-transitory computer-readable storage medium (e.g., the memory) storing instructions that, when executed by the processor, cause one or more components (e.g., the processor) of the apparatus to perform various steps and methods of the modules and units described above. The apparatus for transaction processing may also be referred to as a system for transaction processing. In some embodiments, the apparatus for transaction processing may include a server, a mobile phone, a tablet computer, a PC, a laptop computer, or another computing device.

In the 1990s, an improvement to a technology can be differentiated into a hardware improvement (e.g., an improvement to a circuit structure, such as a diode, a transistor, a switch, etc.) or a software improvement (an improvement to a flow of a method). With the technological development, however, many improvements to method flows may be deemed as direct improvements to hardware circuit structures. Designers may obtain a corresponding hardware circuit structure by programming an improved method flow into a hardware circuit. Therefore, an improvement to a method flow can be realized with a hardware module. For example, Programmable Logic Device (PLD) (e.g., Field Programmable Gate Array (FPGA)) is such integrated circuit that the integrated circuit's logic functions are determined by a user through programming the device. A designer may program on his/her own to "integrate" a digital system onto one piece of PLD, without having to ask a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language must be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used right now includes VHDL (Very-High-Speed Integrated Circuit Hardware Description Language) and Verilog. One of ordinary skill in the art should also know that it would be easy to obtain a hardware circuit to implement a logic method flow by using the above HDLs to carry out a little bit logic programming on the method flow and program the method flow into an IC.

A controller may be implemented in any proper manner. For example, a controller may be in, for example, a form of a microprocessor or processor, as well as a computer readable medium that stores computer readable program codes (e.g., software or firmware) capable of being executed by the (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of a control logic of a memory. One of ordinary skill in the art should also know that, in addition to that a controller is implemented in a manner of pure computer readable program codes, it is feasible to perform logic programming on steps of a method to enable a controller to implement the same functions in a form of a logic gate, a switch, an ASIC, a programmable logic controller, an embedded microcontroller, etc. Therefore, such controller may be deemed as a hardware part, while devices comprised in the controller and configured to achieve various functions may also be deemed as a structure inside the hardware part. Alternatively, devices configured to achieve various functions may even be deemed as both software modules to implement a method and a structure inside a hardware part.

The system, apparatus, module, or unit described in the above embodiments may be implemented by a computer chip or entity, or implemented by a product having a function. A typical implementation device is a computer. In one example, a computer may be, for example, a personal computer, a laptop computer, a cellular phone, a camera phone, a smart phone, a personal digital assistant, a medium player, a navigation device, an email device, a game console, a tablet computer, a wearable device, or a combination of any devices in these devices.

For convenience of description, the above device is divided into various units according to functions for description. Functions of the units may be implemented in one or more pieces of software and/or hardware when the specification is implemented.

One of ordinary skill in the art should understand that the embodiments of the present invention may be provided as a method, a system, or a computer program product. Therefore, the present invention may be implemented as a complete hardware embodiment, a complete software embodiment, or an embodiment combining software and hardware. Moreover, the present invention may be in the form of a computer program product implemented on one or more computer usable storage media (including, but not limited to, a magnetic disk memory, CD-ROM, an optical memory, etc.) comprising computer usable program codes.

The present invention is described with reference to flowcharts and/or block diagrams of the method, device (system), and computer program product according to the embodiments of the present invention. Computer program instructions may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. According to the definitions in the specification, the computer readable media do not include transitory media, such as modulated data signals and carriers.

The terms of "including," "comprising," or any other variants of the terms are intended to encompass a non-exclusive inclusion, causing a process, method, commodity, or device comprising a series of elements to not only comprise these elements, but also comprise other elements that are not clearly listed, or further comprise elements that are inherent to the process, method, commodity, or device. When there is no further restriction, elements defined by the statement "comprising one . . . " do not exclude a process, method, commodity, or device comprising the above elements from further comprising additional identical elements.

One of ordinary skill in the art should understand that the embodiments of the specification may be provided as a method, a system, or a computer program product. Therefore, the specification may be implemented as a complete hardware embodiment, a complete software embodiment, or an embodiment combining software and hardware. Moreover, the specification may be in the form of a computer program product implemented on one or more computer usable storage media (including, but not limited to, a magnetic disk memory, CD-ROM, an optical memory, etc.) comprising computer usable program codes.

The specification may be described in a regular context of a computer executable instruction that is executed by a computer, such as a program module. Generally, the program module comprises a routine, a program, an object, a component, a data structure, etc. for executing a particular task or implementing a particular abstract data type. The specification may also be practiced in distributed computing environments. In these distributed computing environments, remote processing devices connected via communication networks carry out tasks. In the distributed computing environments, a program module may be located in local and remote computer storage media, including storage devices.

The embodiments in this specification are described in a progressive manner with each embodiment focuses on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for the related parts.

The above-described is only embodiments of the specification, which are not used to limit the specification. To one of ordinary skill in the art, the specification may have various modifications and changes. Any modification, equivalent substitution, or improvement made within the spirit and principle of the specification shall be encompassed by the claims of the specification.

What is claimed is:

1. A non-transitory computer-readable storage medium storing instructions that, when executed by a processor, cause the processor to perform operations comprising:
   receiving a transaction request for executing a target transaction having a smart contract transaction type;
   determining whether there is a transaction template matching the smart contract transaction type in a plurality of configured transaction templates corresponding to a blockchain;
   in response to determining that there is a transaction template matching the smart contract transaction type in the plurality of configured transaction templates, loading the transaction template matching the smart contract transaction type of the target transaction;
   determining a smart contract transaction processing rule matching the smart contract transaction type from the transaction template;
   processing the target transaction according to the transaction template by:
      analyzing, the transaction request based on the smart contract transaction processing rule to obtain a smart contract's address and one or more transaction parameters included in the transaction request, wherein the smart contract is stored on the blockchain; and
      invoking, according to the smart contract's address, the smart contract to execute the one or more transaction parameters and output a transaction result; and
   writing the transaction result into the blockchain.

2. The non-transitory computer-readable storage medium of claim 1, wherein the operations further comprise:
   in response to determining that there is no transaction template matching the smart contract transaction type in the plurality of configured transaction templates, generating a smart contract transaction template as the transaction template for loading.

3. The non-transitory computer-readable storage medium of claim 1, wherein loading the transaction template comprises:
   determining a transaction identifier of the target transaction; and
   determining the smart contract transaction type of the target transaction according to the transaction identifier.

4. The non-transitory computer-readable storage medium of claim 1, wherein processing the target transaction according to the transaction template comprises:
   determining a check rule in the transaction template;
   checking whether the transaction request satisfies a preset condition according to the check rule;
   if determining that the transaction request satisfies the preset condition according to the check rule, processing the target transaction according to the smart contract transaction processing rule; and
   if determining that the transaction request does not satisfy the preset condition according to the check rule, returning a prompt that processing of the target transaction has failed.

5. The non-transitory computer-readable storage medium of claim 1, wherein:
   writing the transaction result into the blockchain comprises writing first transaction information of the transaction result into a target block to be added to the blockchain; and
   the operations further comprise, when writing the first transaction information into the target block, determining and storing a state change value of the target block, the state change value being used to check whether the first transaction information recorded in the target block is consistent with other transaction information recorded in other blocks in the blockchain.

6. The non-transitory computer-readable storage medium of claim 5, wherein determining and storing the state change value comprises:
   after writing the first transaction information into the target block, computing a check value of the target block; and
   using the check value as the state change value of the target block.

7. A system, comprising one or more processors and one or more non-transitory computer-readable memories coupled to the one or more processors, the one or more non-transitory computer-readable memories storing instructions that, when executed by the one or more processors, cause the one or more processors to perform operations comprising:
   receiving a transaction request for executing a target transaction having a smart contract transaction type;
   determining whether there is a transaction template matching the smart contract transaction type in a plurality of configured transaction templates corresponding to a blockchain;
   in response to determining that there is a transaction template matching the smart contract transaction type in the plurality of configured transaction templates, loading the transaction template matching the smart contract transaction type of the target transaction;
   determining a smart contract transaction processing rule matching the smart contract transaction type from the transaction template;
   processing the target transaction according to the transaction template by:
      analyzing, the transaction request based on the smart contract transaction processing rule to obtain a smart contract's address and one or more transaction parameters included in the transaction request, wherein the smart contract is stored on the blockchain; and
      invoking, according to the smart contract's address, the smart contract to execute the one or more transaction parameters and output a transaction result; and
   writing the transaction result into the blockchain.

8. The system of claim 7, wherein the operations further comprise:
   in response to determining that there is no transaction template matching the smart contract transaction type in the plurality of configured transaction templates, generating a smart contract transaction template as the transaction template for loading.

9. The system of claim 7, wherein loading the transaction template comprises:
   determining a transaction identifier of the target transaction; and
   determining the smart contract transaction type of the target transaction according to the transaction identifier.

10. The system of claim 7, wherein processing the target transaction according to the transaction template comprises:
   determining a check rule in the transaction template;
   checking whether the transaction request satisfies a preset condition according to the check rule;
   if determining that the transaction request satisfies the preset condition according to the check rule, processing the target transaction according to the smart contract transaction processing rule; and
   if determining that the transaction request does not satisfy the preset condition according to the check rule, returning a prompt that processing of the target transaction has failed.

11. The system of claim 7, wherein:
   writing the transaction result into the blockchain comprises writing first transaction information of the transaction result into a target block to be added to the blockchain; and
   the operations further comprise, when writing the first transaction information into the target block, determining and storing a state change value of the target block, the state change value being used to check whether the first transaction information recorded in the target block is consistent with other transaction information recorded in other blocks in the blockchain.

12. The system of claim 11, wherein determining and storing the state change value comprises:
   after writing the first transaction information into the target block, computing a check value of the target block; and
   using the check value as the state change value of the target block.

13. A method, comprising:
   receiving a transaction request for executing a target transaction having a smart contract transaction type;
   determining whether there is a transaction template matching the smart contract transaction type in a plurality of configured transaction templates corresponding to a blockchain;
   in response to determining that there is a transaction template matching the smart contract transaction type in the plurality of configured transaction templates, loading the transaction template matching the smart contract transaction type of the target transaction;
   determining a smart contract transaction processing rule matching the smart contract transaction type from the transaction template;
   processing the target transaction according to the transaction template by:
      analyzing, the transaction request based on the smart contract transaction processing rule to obtain a smart contract's address and one or more transaction parameters included in the transaction request, wherein the smart contract is stored on the blockchain; and
      invoking, according to the smart contract's address, the smart contract to execute the one or more transaction parameters and output a transaction result; and
   writing the transaction result into the blockchain.

14. The method of claim 13, further comprising:
   in response to determining that there is no transaction template matching the smart contract transaction type in the plurality of configured transaction templates, generating a smart contract transaction template as the transaction template for loading.

15. The method of claim 13, wherein loading the transaction template comprises:
   determining a transaction identifier of the target transaction; and
   determining the smart contract transaction type of the target transaction according to the transaction identifier.

16. The method of claim 13, wherein processing the target transaction according to the transaction template comprises:
   determining a check rule in the transaction template;
   checking whether the transaction request satisfies a preset condition according to the check rule;

if determining that the transaction request satisfies the preset condition according to the check rule, processing the target transaction according to the smart contract transaction processing rule; and if determining that the transaction request does not satisfy the preset condition according to the check rule, returning a prompt that processing of the target transaction has failed.

17. The method of claim 13, wherein:

writing the transaction result into the blockchain comprises writing first transaction information of the transaction result into a target block to be added to the blockchain; and the method further comprises, when writing the first transaction information into the target block, determining and storing a state change value of the target block, the state change value being used to check whether the first transaction information recorded in the target block is consistent with other transaction information recorded in other blocks in the blockchain.

* * * * *